(12) United States Patent
Shang

(10) Patent No.: US 8,992,719 B2
(45) Date of Patent: Mar. 31, 2015

(54) FABRICATION METHOD OF ELECTROCHROMIC ELEMENT

(71) Applicant: Tintable Smart Material Co., Ltd., Tainan (TW)

(72) Inventor: Yu Chun Shang, Tainan (TW)

(73) Assignee: Tintable Smart Medical Co., Ltd., Tainan (TW)

( * ) Notice: Subject to any disclaimer, the term of this patent is extended or adjusted under 35 U.S.C. 154(b) by 371 days.

(21) Appl. No.: 13/649,408

(22) Filed: Oct. 11, 2012

(65) Prior Publication Data

US 2013/0133814 A1 May 30, 2013

(30) Foreign Application Priority Data

Nov. 24, 2011 (TW) .............................. 100143098 A

(51) Int. Cl.
*G02F 1/15* (2006.01)
*B32B 38/00* (2006.01)
*B32B 33/00* (2006.01)

(52) U.S. Cl.
CPC ................. *B32B 38/00* (2013.01); *B32B 33/00* (2013.01); *B32B 2307/40* (2013.01); *G02F 1/15* (2013.01)

USPC ....................................................... 156/309.6

(58) Field of Classification Search
None
See application file for complete search history.

(56) References Cited

U.S. PATENT DOCUMENTS 6,441,942 B1 * 8/2002 Branz et al. .................... 359/265

* cited by examiner

*Primary Examiner* — Barbara J Musser
(74) *Attorney, Agent, or Firm* — Rosenberg, Klein & Lee

(57) ABSTRACT

A fabrication method of an electrochromic element includes the steps of: providing a first substrate and a second substrate, the first substrate including a first base layer and a first transparent conductive layer, the second substrate including a second base layer and a lower second transparent conductive layer; forming an ion storage layer on a surface of the upper first transparent conductive layer, and forming an electrochromic layer on a surface of the lower second transparent conductive layer; forming an electrolyte layer on a surface of the electrochromic layer; oppositely facing and combining the ion storage layer and the electrolyte layer in a gradually slantly manner by use of an assistant material disposed on corresponding peripheries of the electrolyte layer and the ion storage layer; and drying the combined electrolyte layer and the ion storage layer for complete manufacture of the electrochromic element as a finished product.

18 Claims, 4 Drawing Sheets

FABRICATION METHOD OF ELECTROCHROMIC ELEMENT

BACKGROUND OF THE INVENTION

1. Field of the Invention

The present invention relates to a fabrication method of a color-changeable element, particularly to a fabrication method of an electrochromic element.

2. Description of the Related Art

Generally, a conventional electrochromic unit has a laminated structure, and at least one transparent electrode layer is layered on a side surface of the laminated structure. The conventional electrochromic unit generally further includes a couple of glass substrates. If the electrochromic unit is applied to a car-used rearview mirror, one of the glass substrates is able to reflex light. A transparent conductive layer is layered on one side surface of the glass substrates. For example, indium tin oxide (ITO) layer is coating on the side surface. The glass substrates oppositely face to each other and the electrochromic layer is attached therebetween, to form an electrochromic unit. The electrochromic unit is electrically connected to a power source via the ITO layer.

When various driving voltages are respectively applied to the above conventional electrochromic unit, the color of the electrochromic unit will change according to one the corresponding driving voltage. However, the conventional electrochromic unit requires a higher driving voltage, performs with fewer color-levels and worse color contrast. Additionally, after a driving voltage is applied to the electrochromic device and then cut off, the color of the electrochromic device can just maintain for few hours (short-time memory effect). Besides, the electrochromic unit is generally applied to LCD, and thus requiring a higher driving voltage and being unable to maintain the appearance color. Furthermore, the transmittance of the electrochromic device for infrared is considerably high, thus infrared and harmful light cannot be sufficiently isolated.

SUMMARY OF THE INVENTION

An object of the present invention present is to provide a fabrication method of an electrochromic element. The light transmittance and appearance color of the electrochromic element can change according to various applied voltages, and infrared and harmful light can be isolated. Additionally, the electrochromic element of the present invention requires a lower driving voltage, performs with a better color contrast and a long-time memory effect.

To achieve this and other objects of the present invention, a fabrication method of an electrochromic element, including the steps of: (a) providing a first substrate and a second substrate, the first substrate including a first base layer and a first transparent conductive layer, and the second substrate including a second base layer and a second transparent conductive layer; (b) forming an ion storage layer on a surface of the first transparent conductive layer and forming an electrochromic layer on a surface of the second transparent conductive layer; (c) forming an electrolyte layer on a surface of the electrochromic layer; (d) oppositely facing and combining the ion storage layer and the electrolyte layer; and (e) baking the combined the ion storage layer and the electrolyte layer for complete manufacture of the electrochromic element as a finished product.

According to the above-mentioned fabrication method of the electrochromic element, wherein the first base layer and the second base layer are made of glass, plastics or metal.

According to the above-mentioned fabrication method of the electrochromic element, wherein the metal is aluminum, chromium, silver or nickel.

According to the above-mentioned fabrication method of the electrochromic element, wherein the first transparent conductive layer and the second transparent conductive layer are layers of indium tin oxide (ITO), fluorine doped tin oxide (FTO), aluminum doped tin oxide (AZO) or gallium doped zinc oxide (GZO), nano-carbon material, conductive polymer or metal.

According to the above-mentioned fabrication method of the electrochromic element, wherein the ion storage layer and the electrochromic layer include transition metal oxide, intercalated compound and organic compound.

According to the above-mentioned fabrication method of the electrochromic element, wherein the ion storage layer and the electrochromic layer are formed by sputtering.

According to the above-mentioned fabrication method of the electrochromic element, wherein the transition metal oxide is $WO_3$, $NiO_x$, $V_2O_5$ or $CuO_x$, the intercalated compound is $Fe_4[Fe(CN)_6]_3$, and the organic compound is Poly(aniline) or viologen.

According to the above-mentioned fabrication method of the electrochromic element, wherein the electrolyte layer includes polymer, metal salt and additive.

According to the above-mentioned fabrication method of the electrochromic element, wherein the polymer is polymethyl methacrylate (PMMA), polyvinylidene difluoride (PVDF), polyvinyl chloride (PVC), polyethylene oxide (PEO), polyethylene terephthalate (PET), polyhydroxyethyl methacrylate (PHEMA), polyvinyl butyral (PVB) or ethylene vinyl acetate (EVA), the metal salt is lithium salt, silicate or potassium salt, and the additive is a carbonate-containing material.

According to the above-mentioned fabrication method of the electrochromic element, wherein step (c) includes steps of: coating an electrolyte material on a surface of the electrochromic layer to form a film; and carrying out a first drying process to dry the film to form the electrolyte solid-state layer.

According to the above-mentioned fabrication method of the electrochromic element, wherein the coating step is carried out by screen screen printing, tape casting or roll to roll fabrication.

According to the above-mentioned fabrication method of the electrochromic element, wherein the first drying process sequentially includes three stages of: drying under 55-65° C. for 8-12 minutes, drying under 80-100° C. for 6-15 minutes, and drying under 110-130° C. for 8-12 minutes.

According to the above-mentioned fabrication method of the electrochromic element, wherein the fabrication method further includes a step of flatting the electrolyte layer after the first drying process.

According to the above-mentioned fabrication method of the electrochromic element, wherein the fabrication method further includes a step of disposing an assistant material between corresponding peripheries of the ion storage layer and the electrolyte layer after the first drying process, and a step of slantly gradually combining the ion storage layer and the electrolyte layer.

According to the above-mentioned fabrication method of the electrochromic element, wherein the solution is ester-containing solvent.

According to the above-mentioned fabrication method of the electrochromic element, wherein a second drying process is carried out so that the assistant material is melted to incorporate into the electrolyte layer, and the second drying process sequentially includes three stages of: drying under 55-65° C. for 8-12 minutes, drying under 80-100° C. for 6-15 minutes, and drying under 110-130° C. for 8-12 minutes.

According to the above-mentioned fabrication method of the electrochromic element, wherein the assistant material includes a spacer material, the spacer material is polymethyl methacrylate (PMMA) or silicon oxide, and the assistant material and the spacer material are in a weight ratio of 1:[100 to 1000000].

According to the above-mentioned fabrication method of the electrochromic element, wherein the fabrication method further includes a step of coating an UV adhesive on a periphery of the electrolyte layer.

According to the above-mentioned fabrication method of the electrochromic element, wherein the fabrication method further includes a step of coating an UV adhesive on peripheries of the stacked first substrate, second substrate, ion storage layer and electrolyte layer.

According to the above-mentioned fabrication method of the electrochromic element, wherein the fabrication method further includes a step of solidifying the UV adhesive.

The transmittance of the electrochromic element for visible light is about 15-70%, and the transmittance of the electrochromic element for infrared is lower than 3%. After a voltage is applied on the electrochromic element and then cut off, the color of the electrochromic element can maintain for 1-8 hours, so that infrared and harmful light can be isolated. Additionally, the electrochromic element of the present invention requires a lower driving voltage, performs with a better color contrast and a long-time color-changing memory effect.

The light transmittance and appearance color of the electrochromic element can change according to various applied voltages, and infrared and harmful light can be isolated. Additionally, the electrochromic element of the present invention requires a lower driving voltage, performs with a better color contrast and a long-time color-changing memory effect.

Other advantages and features of the present invention will be fully understood by reference to the following specification in conjunction with the accompanying drawings, in which like reference signs denote like components of structure.

DETAILED DESCRIPTION OF THE INVENTION

The advantages and features of the present invention will be fully understood by reference to the following two examples in conjunction with the accompanying drawings.

Figure 1:
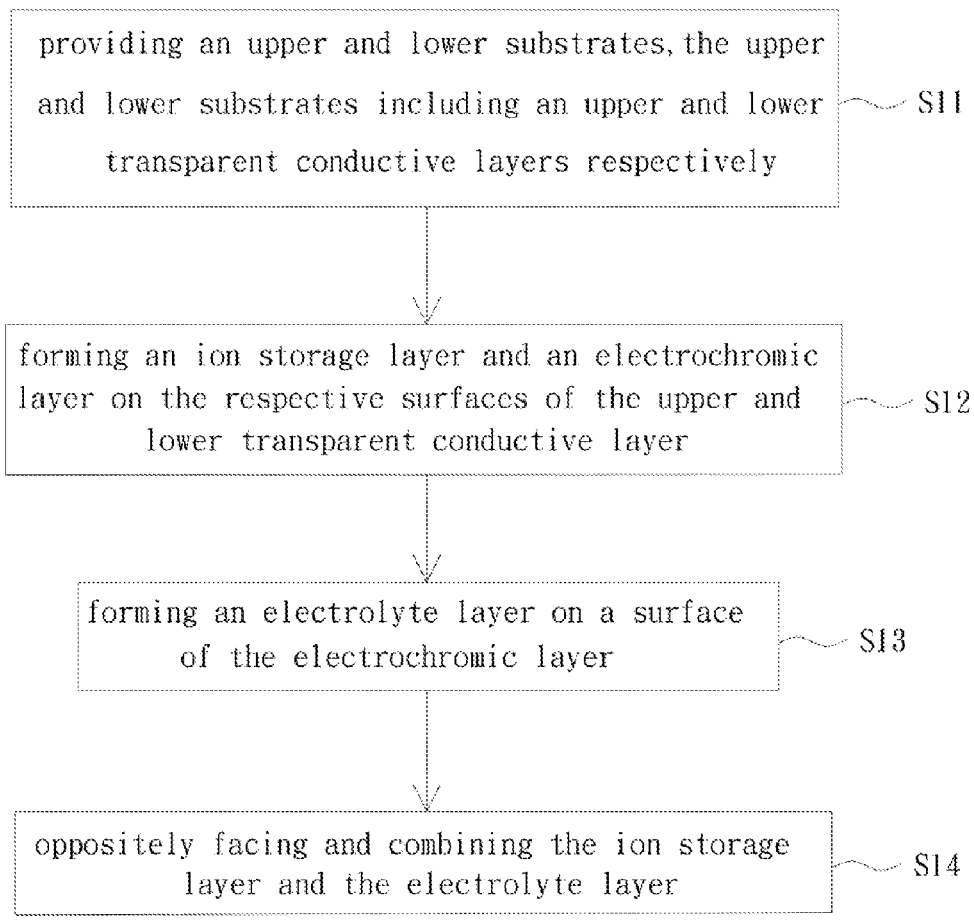
FIG. 1 is a flow chart of a fabrication method of an electrochromic element according to a preferred embodiment of the present invention.

FIG. 1 is a flow chart of a fabrication method of an electrochromic element according to a preferred embodiment of the present invention; and FIGS. 2-6 are views showing a process of fabricating an electrochromic element according to a preferred embodiment of the present invention.

Figure 2:
FIGS. 2-6 are views showing a process of fabricating an electrochromic element according to a preferred embodiment of the present invention.

As shown in FIGS. 1 and 2, in step S11, a first substrate 12 and a second substrate 14 are provided, wherein the first substrate 12 includes a first base layer 121 and a first transparent conductive layer 122, and the second substrate 14 includes a second base layer 141 and a second transparent conductive layer 142. The first base layer 121 and the second base layer 141 may be made of glass, plastics or metal. The metal may be aluminum, chromium, silver or nickel, and has a thickness of 1 um-100 um. The first transparent conductive layer 122 and the second transparent conductive layer 142 are layers of indium tin oxide (ITO), fluorine doped tin oxide (FTO), aluminum doped tin oxide (AZO) or gallium doped zinc oxide (GZO), nano-carbon material, conductive polymer or metal.

Figure 3:

As shown in FIGS. 1 and 3, in step S12, an ion storage layer 16 is formed on a surface of the first transparent conductive layer 122, and an electrochromic layer 18 is formed on a surface of the second transparent conductive layer 142. In this embodiment, the ion storage layer 16 and the electrochromic layer 18 are formed by sputtering. It is noted that, the ion storage layer 16 and the electrochromic layer 18 may be formed by, but is not limited to, electrochemical deposition, vacuum vapor deposition, or sol-gel.

The ion storage layer 16 and the electrochromic layer 18 include transition metal oxide, intercalated compound and organic compound. The transition metal oxide is $WO_3$, $NiO_X$, $V_2O_5$ or $CuO_x$, the intercalated compound is $Fe_4[Fe(CN)_6]_3$, and the organic compound is Poly(aniline) or viologen.

When a driving voltage is input the electrochromic element, changes of colors of the materials (transition metal oxide, intercalated compound and organic compound) in the electrochromic layer 18 are listed in the chart below. Reduction state (−) and oxidation state (+) represent the materials in the electrochromic layer 18 before and after their colors change, respectively.

|  | electrochromic material(s) | oxidation state (+) | reduction state (−) |
|---|---|---|---|
| transition metal oxide | $WO_3$ | transparent | dark blue |
|  | $NiO_X$ | dark brown | transparent |
|  | $V_2O_5$ | gray | yellow |
|  | $CuO_x$ | red | blue |
| intercalated compound | $Fe_4[Fe(CN)_6]_3$ | blue/green | transparent |
| organic compound | Poly(aniline) or viologen | green/purple transparent | yellow blue |

Figure 4:
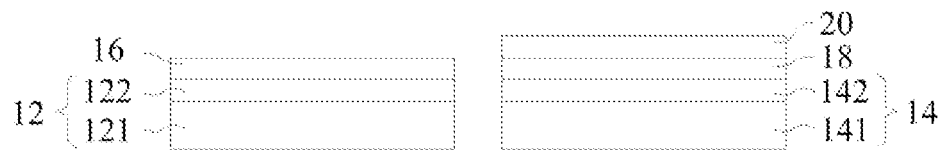

As shown in FIGS. 1 and 4, in step S13, an electrolyte layer 20 is formed on a surface of the electrochromic layer 18. The electrolyte layer 20 includes polymer, metal salt and additive. The polymer is polymethyl methacrylate (PMMA), polyvinylidene difluoride (PVDF), polyvinyl chloride (PVC), polyethylene oxide (PEO), polyethylene terephthalate (PET), polyhydroxyethyl methacrylate (PHEMA), polyvinyl butyral (PVB) or ethylene vinyl acetate (EVA), the metal salt is lithium salt, silicate or potassium salt, and the additive is a carbonate-containing material.

In this embodiment, step S13 includes steps of: coating an electrolyte material on a surface of the electrochromic layer 18 to form a film; and carrying out a first drying process to dry the film to form the electrolyte layer 20. The coating step is carried out by screen printing, tape casting or roll to roll fabrication. In this embodiment, the first drying process sequentially includes three stages of: drying under 55-65° C. for 8-12 minutes, drying under 80-100° C. for 6-15 minutes, and drying under 110-130° C. for 8-12 minutes. Preferably, a step of flatting the electrolyte layer 20 is carried out after the first drying process, so as to uniform the uneven surface and periphery of the dried electrolyte layer 20.

Figure 5:
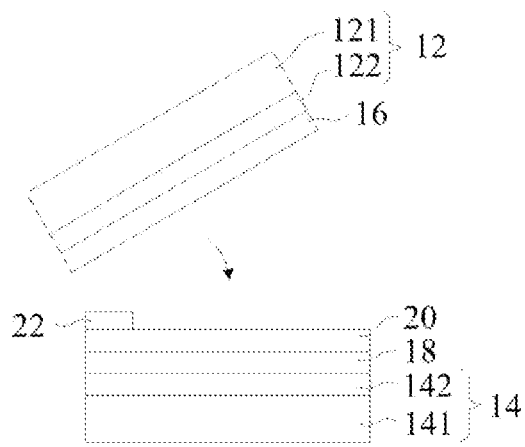
Figure 6:
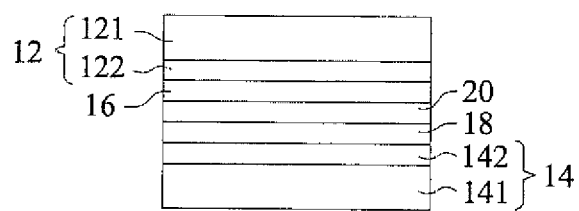

As shown in FIGS. 1 and 5-6, in steps S14 and S15, the ion storage layer 16 and the electrolyte layer 20 oppositely face to each other and are combined together. The ion storage layer 16 and the electrolyte layer 20 may, but not limited to, be combined together by roll-to-roll process.

In this embodiment, after the electrolyte layer 20 is flatted, a step of disposing an assistant material 22 between corresponding peripheries of the ion storage layer 16 and the electrolyte layer 20, and a step of slantly (for example, angled by an angle about 45 degrees) gradually combining the ion storage layer 16 and the electrolyte layer 20 by attaching. It is noted that the ion storage layer 16 and the electrolyte layer 20 may be combined together via face-to-face or other suitable processes. A second drying process is then carried out so that the assistant material 22 melted to incorporate into the electrolyte layer 20, so as to complete the combination of the ion storage layer 16 and the electrolyte layer 20.

The assistant material 22 may be ester-containing solvent or include a spacer material. The spacer material may be polymethyl methacrylate (PMMA) or silicon oxide, and the assistant material and the spacer material are in a weight ratio of 1:[100 to 1000000]. The assistant material 22 can enhance the combination strength of the ion storage layer 16 and the electrolyte layer 20, so as to improve the electron mobility between the ion storage layer 16 and the electrolyte layer 20, and lower the driving voltage of the electrochromic element. In this embodiment, the second drying process sequentially includes three stages: drying under 55-65° C. for 8-12 minutes, drying under 80-100° C. for 6-15 minutes, and drying under 110-130° C. for 8-12 minutes. Preferably, after step S14, a step of coating an UV adhesive on peripheries of the stacked the first substrate 12, the second substrate 14, the ion storage layer 16 and the electrolyte layer 20. A step of solidifying the UV adhesive is then carried out to form an UV adhesive frame. In this embodiment, the UV adhesive is solidified via irradiation of an UV light for about 30 seconds, wherein the wavelength of the UV light is about 315 nm. The UV adhesive frame can protect the first substrate 12, the second substrate 14, the ion storage layer 16 and the electrolyte layer 20.

It should be noted that the UV adhesive frame may be somewhat varied in an alternative embodiment. For example, before step S14, an UV adhesive is coated on a periphery of the electrolyte layer 20. A step of solidifying the UV adhesive is then carried out to form an UV adhesive frame. The UV adhesive frame can protect the ion storage layer 16 and the electrolyte layer 20 which are relatively important and weak in the electrochromic element.

For various driving voltages to drive the electrochromic element of the present invention, the lower the driving voltage the lighter color of the electrochromic element is; the higher the driving voltage the darker color of the electrochromic element is, The electrochromic element can present about 20 color-levels. The transmittance of the electrochromic element for visible light is about 15-70%, and the transmittance of the electrochromic element for infrared is lower than 3%. After a driving voltage is applied on the electrochromic element and then cut off, the color of the electrochromic element can maintain for 1-8 hours.

In sum, the light transmittance and appearance color of the electrochromic element can change according to various applied voltages, and infrared and harmful light can be isolated. Additionally, the electrochromic element of the present invention requires a lower driving voltage, performs with better color contrast and long-time color-changing memory effect.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. A fabrication method of an electrochromic element, including the steps of:
   (a) providing a first substrate and a second substrate, the first substrate including a first base layer and a first transparent conductive layer, and the second substrate including a second base layer and a second transparent conductive layer;
   (b) forming an ion storage layer on a surface of the first transparent conductive layer and forming an electrochromic layer on a surface of the second transparent conductive layer;
   (c) forming an electrolyte layer on a surface of the electrochromic layer;
   (d) oppositely facing and combining the ion storage layer and the electrolyte layer in a gradually slantly manner by use of an assistant material disposed on corresponding peripheries of the electrolyte layer and the ion storage layer; and
   (e) drying the combined electrolyte layer and the ion storage layer so that the assistant material melted to incorporate into the electrolyte layer, for complete manufacture of the electrochromic element.

2. The fabrication method of an electrochromic element of claim 1, wherein the first base layer and the second base layer are made of glass, plastics or metal.

3. The fabrication method of an electrochromic element of claim 2, wherein the metal is aluminum, chromium, silver or nickel.

4. The fabrication method of an electrochromic element of claim 1, wherein the first transparent conductive layer and the second transparent conductive layer are layers of indium tin oxide (ITO), fluorine doped tin oxide (FTO), aluminum doped tin oxide (AZO) or gallium doped zinc oxide (GZO), nano-carbon material, conductive polymer or metal.

5. The fabrication method of an electrochromic element of claim 1, wherein the ion storage layer and the electrochromic layer include transition metal oxide, intercalated compound and organic compound.

6. The fabrication method of an electrochromic element of claim 5, wherein the transition metal oxide is $WO_3$, $NiO_x$, $V_2O_5$ or $CuO_x$, the intercalated compound is $Fe_4[Fe(CN)_6]_3$, and the organic compound is Poly(aniline) or viologen.

7. The fabrication method of an electrochromic element of claim 1, wherein the ion storage layer and the electrochromic layer are formed by sputtering.

8. The fabrication method of an electrochromic element of claim 1, wherein the electrolyte layer includes polymer, metal salt and additive.

9. The fabrication method of an electrochromic element of claim 8, wherein the polymer is polymethyl methacrylate (PMMA), polyvinylidene difluoride (PVDF), polyvinyl chloride (PVC), polyethylene oxide (PEO), polyethylene terephthalate (PET), polyhydroxyethyl methacrylate (PHEMA), polyvinyl butyral (PVB) or ethylene vinyl acetate (EVA), the metal salt is lithium salt, silicate or potassium salt, and the additive is a carbonate-containing material.

10. The fabrication method of an electrochromic element of claim 1, wherein step (c) includes steps of:
   (c1) coating an electrolyte material on a surface of the electrochromic layer to form a film; and
   (c2) carrying out a first drying process to dry the film to form the electrolyte layer.

11. The fabrication method of an electrochromic element of claim 10, wherein the coating step is carried out by screen printing, tape casting or roll to roll fabrication.

12. The fabrication method of an electrochromic element of claim 10, wherein the first drying process sequentially includes three stages of: drying under 55-65° C. for 8-12 minutes, drying under 80-100° C. for 6-15 minutes, and drying under 110-130° C. for 8-12 minutes.

13. The fabrication method of an electrochromic element of claim 10, further including a step of flatting the electrolyte layer after the first drying process.

14. The fabrication method of an electrochromic element of claim 1, wherein the assistant material is ester-containing solvent.

15. The fabrication method of an electrochromic element of claim 1, further including a step of coating an UV adhesive on a periphery of the electrolyte layer before step (d).

16. The fabrication method of an electrochromic element of claim 1, further include a step of coating an UV adhesive on peripheries of the stacked first substrate, second substrate, ion storage layer and electrolyte layer after step (d).

17. The fabrication method of an electrochromic element of claim 15, further including a step of solidifying the UV adhesive after step (d).

18. The fabrication method of an electrochromic device of claim 16, further including a step of solidifying the UV adhesive after step (d).

* * * * *

UNITED STATES PATENT AND TRADEMARK OFFICE
CERTIFICATE OF CORRECTION

PATENT NO. : 8,992,719 B2  
APPLICATION NO. : 13/649408  
DATED : March 31, 2015  
INVENTOR(S) : Yu Chun Shang Page 1 of 1

It is certified that error appears in the above-identified patent and that said Letters Patent is hereby corrected as shown below:

IN THE TITLE PAGE:

ITEM (73), DELETE THE ASSIGNEE NAME "TINTABLE SMART MEDICAL CO., LTD." AND INSERT THE ASSIGNEE NAME --TINTABLE SMART MATERIAL CO., LTD.--

Signed and Sealed this  
Thirteenth Day of October, 2015

Michelle K. Lee  
*Director of the United States Patent and Trademark Office*